United States Patent
Masaki et al.

(10) Patent No.: US 10,247,448 B2
(45) Date of Patent: Apr. 2, 2019

(54) METHOD OF PRODUCING REFRIGERATION WITH R1233ZD

(71) Applicant: Daikin Applied Americas Inc., Minneapolis, MN (US)

(72) Inventors: Kenichi Masaki, St Louis Park, MN (US); Md Anwar Hossain, Maple Grove, MN (US); Hiromune Matsuoka, Plymouth, MN (US)

(73) Assignee: DAIKIN APPLIED AMERICAS INC., Minneapolis, MN (US)

( * ) Notice: Subject to any disclaimer, the term of this patent is extended or adjusted under 35 U.S.C. 154(b) by 124 days.

(21) Appl. No.: 14/753,572

(22) Filed: Jun. 29, 2015

(65) Prior Publication Data

US 2016/0377326 A1 Dec. 29, 2016

(51) Int. Cl.
| | | |
|---|---|---|
| *F25B 1/053* | (2006.01) | |
| *C09K 5/04* | (2006.01) | |
| *F04D 29/058* | (2006.01) | |
| *F25B 31/02* | (2006.01) | |

(52) U.S. Cl.
CPC ............. *F25B 1/053* (2013.01); *C09K 5/044* (2013.01); *F04D 29/058* (2013.01); *F25B 31/026* (2013.01)

(58) Field of Classification Search
CPC .............................. C09K 5/044; F25B 31/026
See application file for complete search history.

(56) References Cited

U.S. PATENT DOCUMENTS

| | | | | |
|---|---|---|---|---|
| 3,526,942 A | * | 9/1970 | Monden | F25B 31/026 29/463 |
| 6,123,529 A | * | 9/2000 | Kawano | F04C 18/0223 418/142 |
| 8,574,451 B2 | | 11/2013 | Hulse et al. | |
| 2006/0148397 A1 | * | 7/2006 | Schultz | F24F 3/161 454/56 |
| 2010/0154444 A1 | | 6/2010 | Hulse et al. | |
| 2010/0307191 A1 | * | 12/2010 | Sommer | F25B 1/10 62/505 |
| 2013/0343927 A1 | | 12/2013 | Ramdane et al. | |
| 2014/0260376 A1 | | 9/2014 | Kopko et al. | |
| 2015/0010383 A1 | | 1/2015 | Sun et al. | |
| 2016/0187042 A1 | * | 6/2016 | Brown | F25B 45/00 62/56 |
| 2017/0146271 A1 | | 5/2017 | Hasegawa et al. | |

FOREIGN PATENT DOCUMENTS

| | | |
|---|---|---|
| JP | 2014-5833 A | 1/2014 |
| JP | 2016-33348 A | 3/2016 |
| WO | 2013/039492 A1 | 3/2013 |

(Continued)

OTHER PUBLICATIONS

International Search Report for the corresponding international application No. PCT/US2016/039773, dated Sep. 23, 2016.

(Continued)

*Primary Examiner* — Filip Zec

(74) *Attorney, Agent, or Firm* — Global IP Counselors, LLP

(57) ABSTRACT

A method of producing refrigeration includes compressing a refrigerant composition including R1233zd in a compressor having a magnetic bearing, within a chiller system.

10 Claims, 2 Drawing Sheets

(56) References Cited

FOREIGN PATENT DOCUMENTS

| WO | 2014/158329 A1 | 10/2014 |
| WO | 2014/197290 A1 | 12/2014 |

OTHER PUBLICATIONS

International Preliminary Report on Patentability for the corresponding international application No. PCT/US2016/039773, dated Jan. 2, 2018.
Written Opinion for the corresponding international application No. PCT/US2016/039773, dated Sep. 23, 2016.

* cited by examiner

METHOD OF PRODUCING REFRIGERATION WITH R1233ZD

BACKGROUND

Field of the Invention

The present invention generally relates to a method of producing refrigeration. More specifically, the present invention relates to a method of producing refrigeration with a refrigerant composition including R1233zd.

Background Information

A chiller system is a refrigerating machine or apparatus that removes heat from a medium. Commonly a liquid such as water is used as the medium and the chiller system operates in a vapor-compression refrigeration cycle. This liquid can then be circulated through a heat exchanger to cool air or equipment as required. As a necessary byproduct, refrigeration creates waste heat that must be exhausted to ambient or, for greater efficiency, recovered for heating purposes. A conventional chiller system often utilizes a centrifugal compressor, which is often referred to as a turbo compressor. Thus, such chiller systems can be referred to as turbo chillers. Alternatively, other types of compressors, e.g. a screw compressor, can be utilized.

In a conventional (turbo) chiller, refrigerant is compressed in the centrifugal compressor and sent to a heat exchanger in which heat exchange occurs between the refrigerant and a heat exchange medium (liquid). This heat exchanger is referred to as a condenser because the refrigerant condenses in this heat exchanger. As a result, heat is transferred to the medium (liquid) so that the medium is heated. Refrigerant exiting the condenser is expanded by an expansion valve and sent to another heat exchanger in which heat exchange occurs between the refrigerant and a heat exchange medium (liquid). This heat exchanger is referred to as an evaporator because refrigerant is heated (evaporated) in this heat exchanger. As a result, heat is transferred from the medium (liquid) to the refrigerant, and the liquid is chilled. The refrigerant from the evaporator is then returned to the centrifugal compressor and the cycle is repeated. The liquid utilized is often water.

A conventional centrifugal compressor basically includes a casing, an inlet guide vane, an impeller, a diffuser, a motor, various sensors and a controller. Refrigerant flows in order through the inlet guide vane, the impeller and the diffuser. Thus, the inlet guide vane is coupled to a gas intake port of the centrifugal compressor while the diffuser is coupled to a gas outlet port of the impeller. The inlet guide vane controls the flow rate of refrigerant gas into the impeller. The impeller increases the velocity of refrigerant gas, generally without changing pressure. The diffuser increases the refrigerant pressure without changing the velocity. The motor rotates the impeller. The controller controls the motor, the inlet guide vane and the expansion valve. In this manner, the refrigerant is compressed in a conventional centrifugal compressor. The inlet guide vane is typically adjustable and the motor speed is typically adjustable to adjust the capacity of the system. In addition, the diffuser may be adjustable to further adjust the capacity of the system. The controller controls the motor, the inlet guide vane and the expansion valve. The controller can further control any additional controllable elements such as the diffuser.

One typical refrigerant used in conventional chiller systems using conventional compressors is R134A. More recently, R1233zd has been used in chiller applications. See U.S. Pat. No. 8,574,451.

SUMMARY

In terms of global environment protection, use of new low GWP (Global Warming Potential) refrigerants such like R1234ze, R1233zd are considered for HVACR stationary applications. Low pressure refrigerant R1233zd is a candidate for centrifugal chiller applications because it is non-flammable, non-toxic and has a high COP compared to other candidates such like R1234ze, which are current major refrigerant R134a alternatives.

However, it can be difficult to find an appropriate lubricating oil for R1233zd due to the slightly less chemical stability of R1233zd. Because R1233zd has slightly less chemical stability, R1233zd is easier to decompose than R1234ze. R1233zd contains chlorine (—Cl), which leads to the slightly less chemical stability. Therefore, in a conventional centrifugal compressor using R1233zd, an appropriate lubricating oil must be used and/or a labyrinth seal should be used in order to seal the motor and bearings side (oil side) from the inlet guide vane, impeller and diffuser side (compressing, non-oil side). Nevertheless, because of the low pressure operation, lubricating oil will tend to be sucked through the labyrinth seal when used, which can lead to degradation of the R1233zd refrigerant.

In addition, even when an appropriate lubricating oil can be used, when R1233zd is used there is a risk of lubricant degradation caused by possible ingress of moisture and/or contamination from the atmosphere because the chiller system usually operates under a negative pressure condition at the evaporator due to the properties of R1233zd (boiling point of R1233zd is 19° C., R134a is −26° C. and R1234ze is −19° C.).

Therefore, one object of the present invention is to provide a method of producing refrigeration, which reduces and/or dispels any of the above risks associated with the lubricating oil and using R1233zd in a compressor.

Another object of the present invention is to provide a method of producing refrigeration, which provides an earth-conscious, safe and reliable product.

One or more of the above objects can basically be attained by providing a method of producing refrigeration in accordance with a first aspect of the present invention. The method of the first aspect includes compressing a refrigerant composition including R1233zd in a compressor having a magnetic bearing, within a chiller system. When a magnetic bearing is used, lubricating oil for the shaft is no longer required.

In a method of a second aspect, according to the first aspect, the compressor is a centrifugal compressor. In a centrifugal compressor there are no contact areas between the impeller, inlet guide vane and diffuser and other parts. A magnetic bearing offers a non-contact rotor support system with extremely low friction and wear. While conventional bearings (e.g. roller bearings, fluid-film bearings) physically interface with the shaft and require some form of lubrication, magnetic bearings suspend the target rotor in a magnetic field, eliminating contact wear. Therefore, no lubricating oil is needed between these parts yet there is low friction and low wear.

In a method of a third aspect, according to the first and/or second aspects, the compressor is a hermetic compressor. When the compressor is a hermetic compressor, whether lubricating oil is used or not, ingress of contaminants into the compressor casing due to the low pressure environment can be reduced and/or eliminated. Therefore, the R1233zd is less likely to be decomposed from contaminants entering the casing.

In a method of a fourth aspect, according to any of the first to third aspects, the compressor contains no lubricating oil. When the compressor contains no lubricating oil, the R1233zd is less likely to be decomposed from the lubricating oil or contaminants contained in the lubricating oil.

In a method of a fifth aspect, according to any of the first to fourth aspects, the magnetic bearing is an active magnetic bearing. Active magnetic bearings utilize non-contact position sensors to monitor shaft position and feed this information back to a control system. The magnetic bearing controller uses this feedback to adjust the required current to a magnetic actuator to maintain proper rotor position. When an active magnetic bearing is used, low wear and long life can be further facilitated as compared to a non-active magnetic bearing.

BRIEF DESCRIPTION OF THE DRAWINGS

Referring now to the attached drawings which form a part of this original disclosure.

DETAILED DESCRIPTION OF EMBODIMENT(S)

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
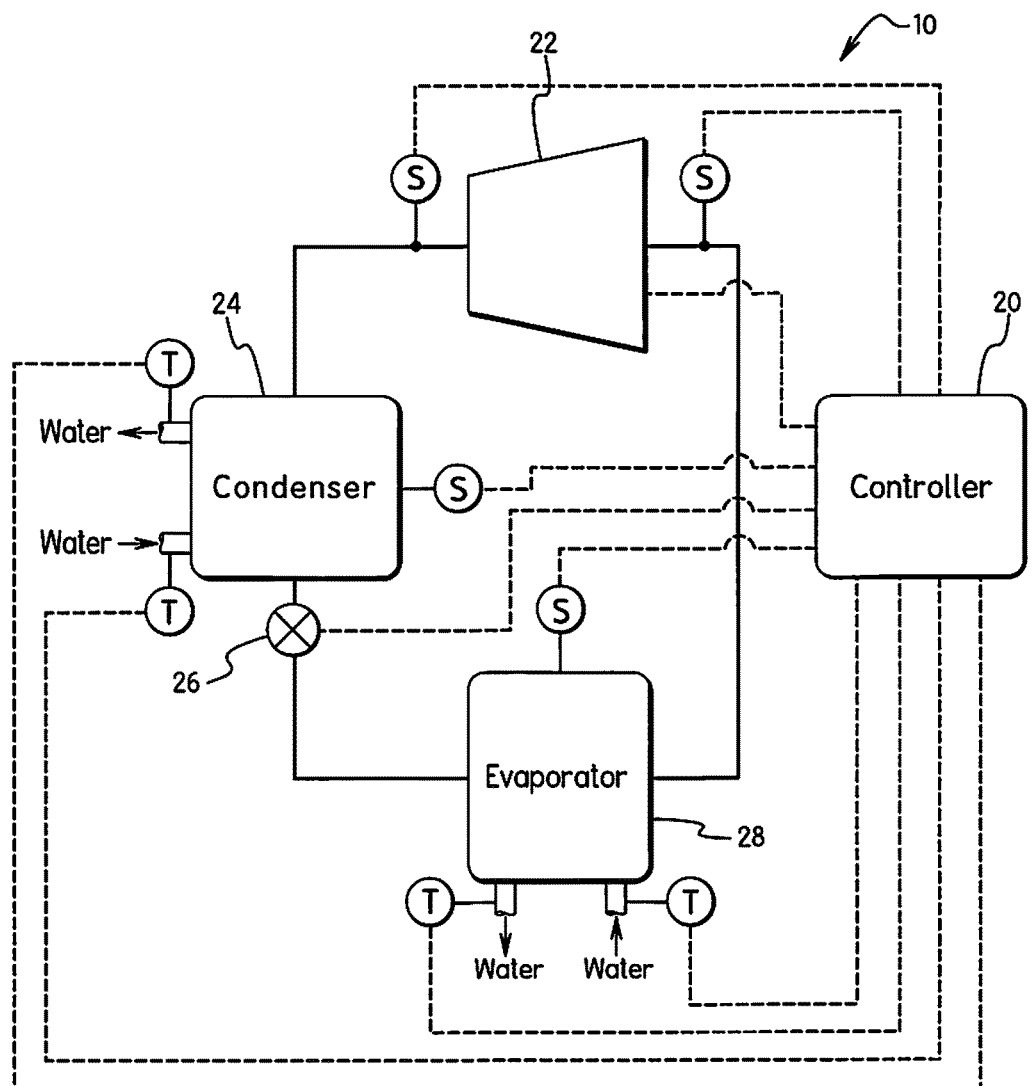
FIG. 1 illustrates a chiller system in accordance with an embodiment of the present invention.

Referring initially to FIG. 1, a chiller system 10 is illustrated in accordance with an embodiment of the present invention. The chiller system 10 is preferably a water chiller that utilizes cooling water and chiller water in a conventional manner. The chiller system 10 illustrated herein is a single stage chiller system. However, it will be apparent to those skilled in the art from this disclosure that the chiller system 10 could be a multiple stage chiller system. The chiller system 10 basically includes a chiller controller 20, a compressor 22, a condenser 24, an expansion valve 26, and an evaporator 28 connected together in series to form a loop refrigeration cycle. In addition, various sensors S and T are disposed throughout the circuit as shown in FIG. 1. The chiller system 10 is conventional except that the chiller system uses a refrigerant composition including R1233zd and a centrifugal compressor 22 in accordance with the present invention.

In the illustrated embodiment, the compressor 22 is a centrifugal compressor. The centrifugal compressor 22 of the illustrated embodiment basically includes a casing, 30, an inlet guide vane 32, an impeller 34, a diffuser 36, a motor 38 and a magnetic bearing assembly 40 as well as various conventional sensors (not shown). The chiller controller 20 receives signals from the various sensors and controls the inlet guide vane 32, the motor 38 and the magnetic bearing assembly 40 in a conventional manner, as explained in more detail below. Refrigerant flows in order through the inlet guide vane 32, the impeller 34 and the diffuser 36. The inlet guide vane 32 controls the flow rate of refrigerant gas into the impeller 34 in a conventional manner. The impeller 34 increases the velocity of refrigerant gas, generally without changing pressure. The motor speed determines the amount of increase of the velocity of refrigerant gas. The diffuser 36 increases the refrigerant pressure without changing the velocity. The motor 38 rotates the impeller 34 via a shaft 42. The magnetic bearing assembly 40 magnetically supports the shaft 42. In this manner, the refrigerant is compressed in the centrifugal compressor 22.

The centrifugal compressor is conventional, except that the centrifugal compressor 22 utilizes the R1233zd refrigerant, the magnetic bearing assembly 40 and the casing 30. In the illustrated embodiment, the casing 30 is a hermetic casing which contains no lubricating oil. R1233zd is a low pressure, low GWP (Global Warming Potential) refrigerant, which is also non-flammable, non-toxic and has a relatively high COP. However, as mentioned above, it can be difficult to find an appropriate lubricating oil for R1233zd. However, in the illustrated embodiment, the magnetic bearing assembly 40 is used, making lubricating oil unnecessary. Moreover, in the illustrated embodiment, the centrifugal compressor 22 with no contact between the parts is used. Therefore, wear inside the centrifugal compressor is reduced the likelihood of repair is reduced. In view of these points, and in view of the low pressure challenges associated with R1233zd discussed above, in the illustrated embodiment, the centrifugal compressor 22 is constructed as a hermetic centrifugal compressor 22. In addition, because the centrifugal compressor 22 is a hermetic compressor, the diffuser 36 is preferably non-adjustable. Adjustable diffusers are known in the art but can be relatively complicated.

The properties of R1233zd refrigerant will now be discussed as compared to other refrigerants. R134a has a coefficient of performance (COP) of 100 and a cooling capacity (CC) of 100. These values can be considered baseline (100%) values as compared to the refrigerants discussed next. R1234yf has a COP of 97 and a CC of 94. R1234ze has a COP of 100 and a CC of 75. R1233zd has a COP of 106 but a CC of only 23. It will be apparent to those skilled in the art from this disclosure that values of COP and CC could vary slightly depending on operating condition. R1234 refrigerants also have no ozone destruction properties and are stable because of the lack of (−Cl). R1233zd has a very low ozone destruction, but is also less flammable than R1234 refrigerants. Therefore, R1233zd is used in the illustrated embodiment. Because R1233zd has such a relatively low CC, the motor 38 can be rotated faster to obtain more CC. However, because of the use of the magnetic bearing assembly 40, wear will not be increased even if the rotation speed of the motor 38 is higher. As an alternative embodiment, R1336mzz could be used in place of R1233zd without departing from the present invention.

Figure 2:
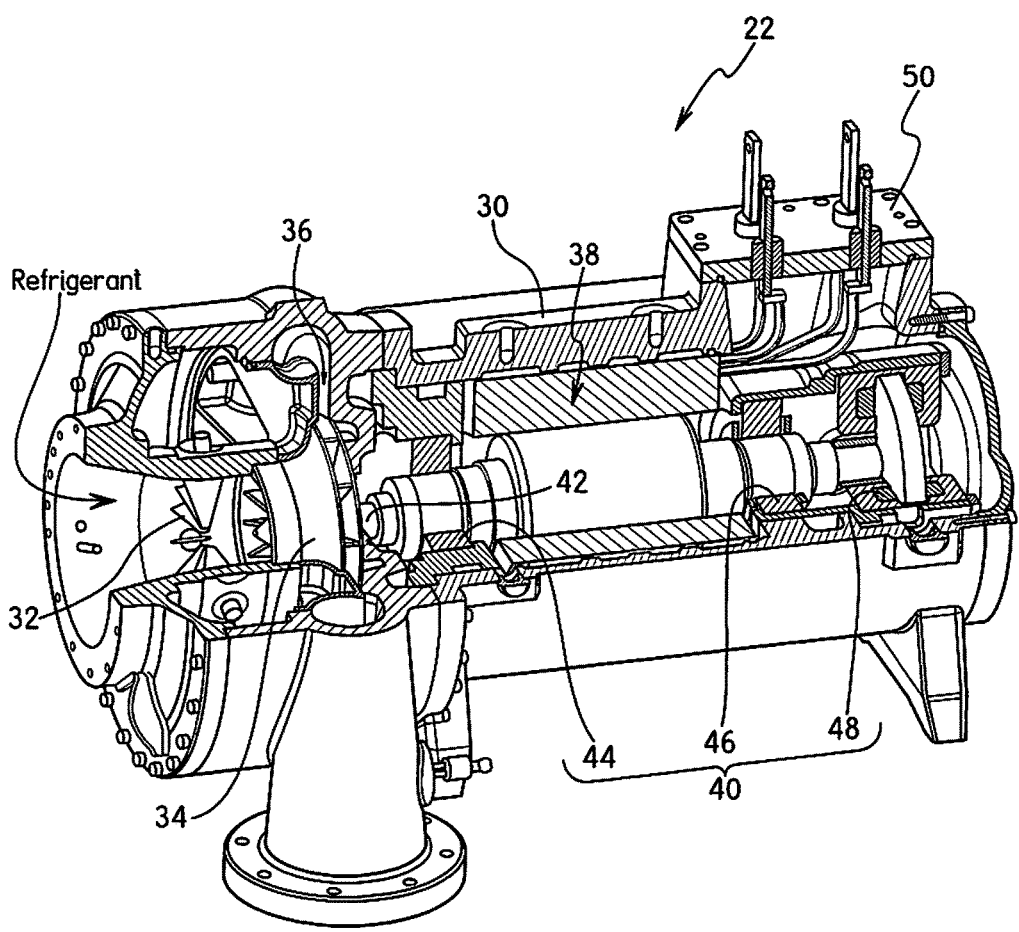
FIG. 2 is a perspective view of the centrifugal compressor of the chiller system illustrated in FIG. 1, with portions broken away and shown in cross-section for the purpose of illustration.

The magnetic bearing assembly 40 is conventional, and thus, will not be discussed and/or illustrated in detail herein. Rather, it will be apparent to those skilled in the art that any suitable magnetic bearing can be used without departing from the present invention. As seen in FIG. 2, the magnetic bearing assembly 40 preferably includes a first radial magnetic bearing 44, a second radial magnetic bearing 46 and an axial (thrust) magnetic bearing 48. The first and second radial magnetic bearings 44 and 46 are disposed on opposite axial ends of the motor 38. Various sensors (not shown) sense radial and axial positions of the shaft 42 relative to the magnetic bearings 44, 46 and 48, and send signals to the chiller controller 20 in a conventional manner. The chiller controller 20 then controls the electrical current sent to the magnetic bearings 44, 46 and 48 in a conventional manner to maintain the shaft 42 in the correct position. Since the operation of magnetic bearings and magnetic bearing assemblies such as magnetic bearings 44, 46 and 48 of magnetic bearing assembly 40 are well known in the art, the magnetic bearing assembly 40 will not be explained and/or illustrated in further detail herein.

The magnetic bearing assembly 40 is preferably an active magnetic bearing, which utilizes non-contact position sensors to monitor shaft 42 position and feeds this information back to the chiller controller 20. Thus, each of the magnetic bearings 44, 46 and 48 are preferably active magnetic bearings. A magnetic bearing control section uses this feedback to adjust the required current to a magnetic actuator to maintain proper rotor position. Active magnetic bearings are well known in the art, and thus, will not be explained and/or illustrated in detail herein.

As explained above, the compressor 22 in the illustrated embodiment is preferably a hermetic centrifugal compressor 22. The general features of a hermetic compressor will now be explained. The compressor 22 can be constructed as explained below or using any other conventional structures/techniques, without departing from the present invention. In a hermetic compressor, the compressor and the motor are enclosed in an airtight casing and the two are connected by a common shaft. Therefore, a hermetic compressor is hermetically sealed. This makes the whole compressor and the motor a single unit. The hermetically sealed compressor is different from the traditional open type of compressors in which the compressor and the motor are different entities and the compressor is connected to the motor by coupling or belt. In a hermetically sealed compressor, in one side of the enclosed casing the various parts of the compressor are located. On the other side of the casing is the electric winding inside which the shaft of the motor rotates. In hermetically sealed compressors the crankshaft of the compressor and the rotating shaft of the motor are common. The rotating shaft of the motor extends beyond the motor and forms the crankshaft of the hermetically sealed compressor.

All these parts of the hermetically sealed compressor are assembled and enclosed in a strong and rigid casing usually made up of a welded steel shell. The steel shell, in the simplest form, comprises two half rounded steel bodies that are welded together to form the casing for the hermetically sealed compressor. However, in some cases the two halves of the shell can be bolted together instead of welding, which permits easy opening of the casing in case of compressor burnout. Moreover, more complicated, more than two parts, constructions are possible. Regardless, it is well known in the art how to make a casing hermetically sealed, and thus, this feature of the illustrated embodiment will not be explained and/or illustrated in detail herein. In FIG. 2, at least one part is shown bolted to another part and welds are not shown in detail for the sake of convenience, i.e., because such structures are well known in the compressor art. In any case, it will be apparent to those skilled in the art from this disclosure that the seems can be welded and/or bolted to each other in order to form the hermetic casing 30 in a conventional manner.

Hermetically sealed compressors can have inbuilt lubrication system for the lubrication of the compression parts and the crankshaft. However, as mentioned above, in this embodiment, no lubricating oil is contained in the hermetic centrifugal compressor 22. Externally, the casing has refrigerant suction and discharge connections that are connected to the evaporator and condenser respectively. There is also socket for the electrical connection for the various electrical parts (see FIG. 2). The typical condenser and evaporator units used with the hermetically sealed compressor are called hermetic condenser and evaporator units. Hermetic compressors are fairly common for small refrigeration applications such as a deep freeze. In these applications, a broken compressor can be merely replaced instead of being repaired because of the size and relatively small cost. However, hermetic compressors are not typically used for large applications such as centrifugal compressors because of the high cost and the possible need to service internal components. However, in the instant embodiment because the magnetic bearing assembly 40 is used there is less likely a need to service internal components. In addition, in the case of a centrifugal compressor, there is a lack of contact between parts making the likelihood of wear/service less.

The chiller controller 20 includes a magnetic bearing control section, a variable frequency drive, a motor control section, an inlet guide vane control section, and an expansion valve control section. The magnetic bearing control section, the variable frequency drive, the motor control section and the inlet guide vane control section form parts of a centrifugal compressor control portion that is electrically coupled to an I/O interface 50 of the compressor 22. Therefore, the chiller controller 20 can receive signals from the various sensors (not shown) of the compressor 22, perform calculations and transmit control signals to the compressor 22. Similarly, the chiller controller can receive signals from the sensors S and T, perform calculations and transmit control signals to the compressor 22 and the expansion valve. The control sections and the variable frequency drive can be separate controllers or can be mere sections of the chiller controller programmed to execute the control of the parts described herein. In other words, it will be apparent to those skilled in the art from this disclosure that the precise number, location and/or structure of the control sections, control portion and/or chiller controller 20 can be changed without departing from the present invention so long as the one or more controllers are programed to execute control of the parts of the chiller system 10 as explained herein.

The chiller controller 20 is conventional, and thus, includes at least one microprocessor or CPU, an Input/output (I/O) interface, Random Access Memory (RAM), Read Only Memory (ROM), a storage device forming a computer readable medium programmed to execute one or more control programs to control the chiller system 10. The chiller controller 20 may optionally include an input interface such as a keypad to receive inputs from a user and a display device used to display various parameters to a user. The parts and programming are conventional, and thus, will not be discussed in detail herein, except as needed to understand the embodiment(s).

The magnetic bearing control section receives signals from the various sensors (not shown) of the magnetic bearing assembly 40, and transmits electrical signals to the bearings 44, 46 and 48 to maintain the shaft 42 in the desired position in a conventional manner. More specifically, the magnetic bearing control section is programmed to execute a magnetic bearing control program to maintain the shaft 42 in the desired position in a conventional manner. The variable frequency drive and motor control section receive signals from at least one motor sensor (not shown) and controls the rotation speed of the motor 38 to control the capacity of the compressor 22 in a conventional manner. More specifically, the variable frequency drive and motor control section are programmed to execute one or more motor control programs controls the rotation speed of the motor 38 to control the capacity of the compressor 22 in a conventional manner. The inlet guide vane control section receives signals from at least one inlet guide vane sensor (not shown) and controls the position of the inlet guide vane 32 to control the capacity of the compressor 22 in a conventional manner. More specifically, the inlet guide vane control section is programmed to execute an inlet guide vane control program to control the position of the inlet guide vane 32 to control the capacity of the compressor 22 in a conventional manner. The expansion valve control section controls the opening degree of the expansion valve 26 to control the capacity of the chiller system 10 in a conventional manner. More specifically, the expansion valve control section is programmed to execute an expansion valve control program to control the opening degree of the expansion valve 26 to control the capacity of the chiller system 10 in a conventional manner. The motor control section and the inlet guide vane control section work together and with the expansion valve control section to control the overall capacity of the chiller system 10 in a conventional manner. The chiller controller 20 receives signals from the sensors S and optionally T to control the overall capacity in a conventional manner. The optional sensors T are temperature sensors. The sensors S are preferably conventional pressure sensors and/or temperature sensors used in a conventional manner to perform the control.

The method of producing refrigeration of the illustrated embodiment includes compressing a refrigerant composition including R1233zd in the compressor 22 having the magnetic bearing assembly 40, within the chiller system 10. The compressed refrigerant is then sent to the condenser 24 where heat is transferred from the refrigerant to the medium (water in this case). The refrigerant cooled in the condenser 24 is then expanded by the expansion valve 26 and sent to the evaporator 28. In the evaporator 28, the refrigerant absorbs heat from the medium (water in this case) to chill the medium. Therefore, refrigeration is produced. The refrigerant is then sent back to the compressor 22 and the cycle is repeated in a conventional manner.

As mentioned above, in the illustrated embodiment, the compressor 22 is preferably a centrifugal compressor 22. Therefore, the compressing is preferably performed in a centrifugal compressor 22. As mentioned above, the compressor 22 is preferably a hermetic compressor 22. Therefore, the compressing is preferably performed in a centrifugal compressor 22. As mentioned above, the compressor 22 preferably contains no lubricating oil. Therefore, the compressing is preferably performed in a compressor 22 that contains no lubricating oil. As mentioned above, the magnetic bearing is preferably an active magnetic bearing. Therefore, the compressing is performed in a compressor 22 having an active magnetic bearing.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of producing refrigeration comprising:
compressing a refrigerant composition including R1233zd in a hermetic centrifugal compressor preventing contaminants from entering the hermetic compressor even if operated in a negative pressure condition, with the hermetic compressor having a magnetic bearing and containing no lubricating oil, within a chiller system,
the hermetic centrifugal compressor having a baseline cooling capacity when operated at a rotation speed with R134a being compressed,
the hermetic centrifugal compressor having lower cooling capacity when operated at the rotation speed with the refrigerant composition including R1233zd being compressed, and
the hermetic centrifugal compressor being rotated faster than the rotation speed so that an actual cooling capacity is higher than the lower cooling compressing of the refrigerant composition including R1233zd in the hermetic centrifugal compressor.

2. The method according to claim 1, wherein the magnetic bearing is an active magnetic bearing.

3. The method according to claim 1, wherein the hermetic compressor includes a hermetic casing with a motor disposed therein.

4. The method according to claim 3, wherein the magnetic bearing is disposed in the hermetic casing.

5. The method according to claim 1, wherein
the hermetic compressor includes a hermetic casing with the magnetic bearing disposed therein.

6. The method according to claim 3, wherein
during the compressing of the refrigerant composition including R1233zd in the hermetic centrifugal compressor, the hermetic centrifugal compressor is operated in the negative pressure condition.

7. The method according to claim 4, wherein during the compressing of the refrigerant composition including R1233zd in the hermetic centrifugal compressor, the hermetic compressor is operated in the negative pressure condition.

8. The method according to claim 5, wherein during the compressing of the refrigerant composition including R1233zd in the hermetic centrifugal compressor, the hermetic compressor is operated in the negative pressure condition.

9. The method according to claim 1, wherein during the compressing of the refrigerant composition including R1233zd in the hermetic centrifugal compressor, the hermetic compressor is operated in the negative pressure condition.

10. The method according to claim 2, wherein during the compressing of the refrigerant composition including R1233zd in the hermetic centrifugal compressor, the hermetic compressor is operated in the negative pressure condition.

* * * * *